June 22, 1943. W. N. ANDREWS 2,322,499

AUXILIARY BRAKE OPERATOR FOR VEHICLES

Filed April 1, 1942

INVENTOR.
WILLIAM NORMAN ANDREWS
BY
Carl Miller
ATTORNEY

Patented June 22, 1943

2,322,499

UNITED STATES PATENT OFFICE 2,322,499

AUXILIARY BRAKE OPERATOR FOR VEHICLES

William Norman Andrews, New York, N. Y.

Application April 1, 1942, Serial No. 437,191

1 Claim. (Cl. 188—106)

This invention relates to auxiliary brake operator for vehicles.

An object of this invention is to provide an auxiliary brake operating mechanism for an automobile, whereby to permit stopping of the automobile by any of the passengers in the automobile in case of emergency.

It is known that the driver of an automobile is subject to heart attack, shock, stroke, dizziness, intoxication, sleepiness and may otherwise be affected so as to endanger the occupants of the automobile. In accordance with the present invention, any of the passengers can stop the car readily by operating a member within reach of each of the passengers, either in the front seat, or in the rear seat, to apply the brake to the vehicle.

Still another object of this invention is to provide a highly improved auxiliary brake operating device of the character described, which shall be easy to manipulate, relatively inexpensive to manufacture, easy to instal in any vehicle now in use, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown various possible illustrative embodiments of this invention, Fig. 1 is a side elevational, cross-sectional view of a portion of a vehicle, and illustrating auxiliary brake control device embodying the invention, for passengers in the front and rear seats of the vehicle;

Figure 1:
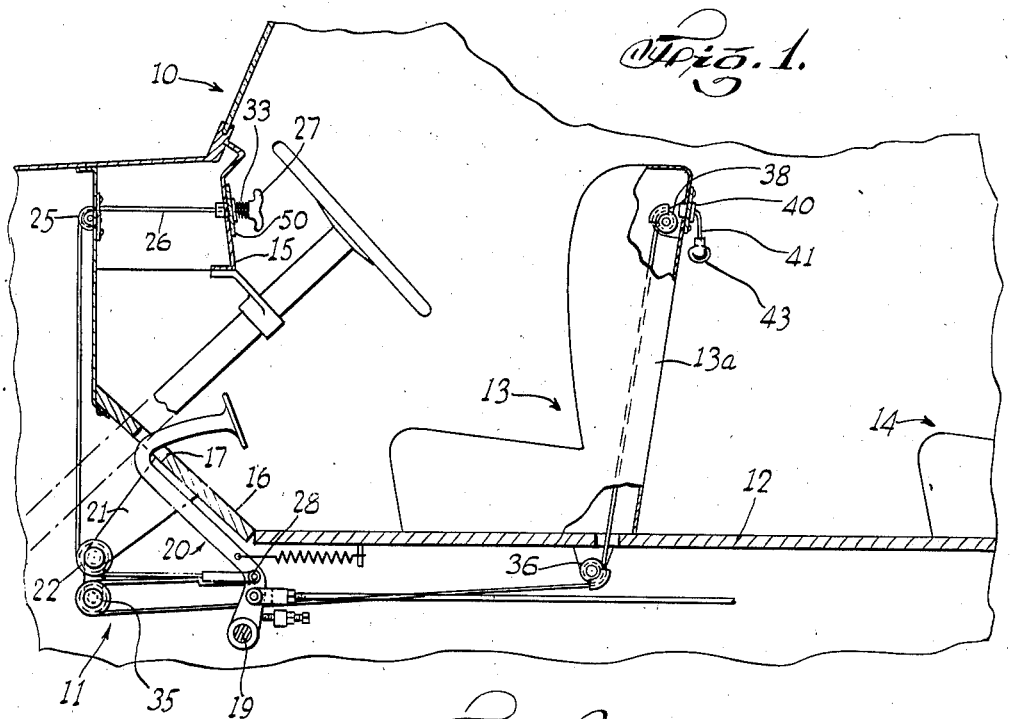
Figure 2:
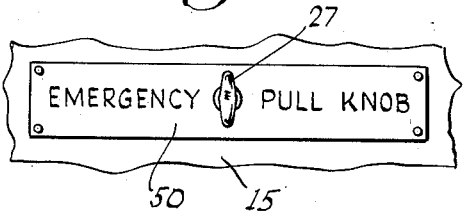
Fig. 2 is an elevational view of a portion of the dashboard of the vehicle.

Referring now in detail to drawing, 10 designates an automobile embodying the invention, provided with auxiliary brake control apparatus 11 embodying the invention. The vehicle 10 is provided with a usual floor 12, a front seat 13, a rear seat 14 and a dashboard 15. In front of the front seat 13, is a usual footboard formed with an opening 17.

Pivoted to the frame of the car, as at 19, is a brake lever 20 passing through the opening 17.

The operator of the car may apply the brakes by depressing the foot lever in the usual manner.

The auxiliary brake applying means 11, provides means to apply the brakes by passengers other than the driver, either sitting in the front seat 13 or in the rear seat 14.

Fixed to the floor board 16 is a bracket 21 carrying a pulley 22. In back of the dashboard 15 is a pulley 25. Passing through suitable openings in the dashboard 15, is a cable 26 provided with a pull knob 27 located in such position that the person sitting next to the driver may pull the same. The cable 26 passes around the pulleys 25 and 22 and is attached as at 28, to the foot lever 20, below the floor 12 of the vehicle.

It will be noted that the pulleys 25 and 22 are substantially in vertical alignment.

Interposed between the pull knob 27 on the dashboard 15, is a coil compression spring 33. It will now be understood that should the driver fail to apply the brake when the vehicle should be stopped, the person sitting next to him can pull the knob 27, thus causing the foot pedal 20 to be depressed and applying the brakes to the vehicle.

Below the pulley 22 there is rotatably mounted another pulley 35. Below the seat 13 is a pulley 36. Within the back 13a of the front seat 13, and above the pulley 36 is a pulley 38. The back of the front seat is formed with an opening supporting a sleeve or bushing 40. Passing through the bushing 40 is a cable 41. The cable 41 passes around pulley 38 and beneath pulley 36 and around pulley 35, and is attached to the brake lever 20 likewise at 28.

At the free end of the cable 41 is a pull knob 43. It will now be understood that persons sitting on the back seat 14 may grasp the knob or head 43 and pull cable 41 to cause the brake lever 20 to be depressed for applying the brakes. Thus, the brakes may be applied either from the front or rear of the car.

On the dashboard 15 there may be a plaque or sign 50 on which may be printed the words "Emergency pull knob."

Figure 3:
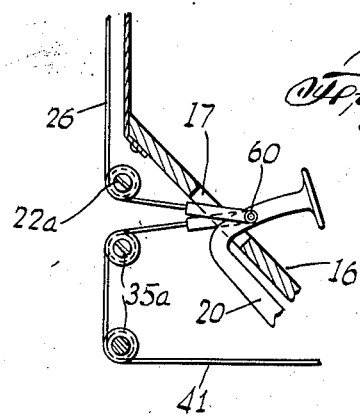
Fig. 3 is a partial, elevational, cross-sectional view illustrating a modified construction.

In Fig. 3 of the drawing, there is shown a modified construction. In Fig. 3, the brake lever 20 is of usual construction. Instead of pulley 22, there is provided a pulley 22a located at substantially the level of the upper end of the brake lever. The cable 26 is attached to the upper portion of the foot lever, as at 60, and passes through the opening 17 in the footboard 16 of the vehicle.

Furthermore, the pulley 35 of Fig. 1 is replaced by a pair of vertically aligned pulleys 35a, and the cable 41 passes around the pulleys 35a and is likewise attached as at 60 to the upper end of the brake lever. With such construction, there is greater leverage applied to the brake lever because the point of attachment of the cables 26 and 41 is adjacent the upper end of the brake lever.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

In a vehicle having a floorboard, dashboard, front seat and a pivoted brake lever extending through said floorboard, a downwardly projecting bracket secured to the underside of said floorboard adjacent said lever, a pair of pulleys rotatably supported by said bracket, a pulley mounted on the rear of said dashboard, a cable connected to said brake lever and extending over one of said pair of pulleys and said dashboard pulley, the dashboard having an aperture and said cable passing through said aperture, a handle secured to the terminal portion of said cable on said dashboard, a fourth pulley secured to the underside of said floorboard beneath said front seat, a fifth pulley mounted within said front seat adjacent the upper portion thereof, a second cable secured to said lever and passing over the second one of said pair of pulleys, over said fourth pulley, through said front seat and over said fifth pulley, the rear of said front seat having an opening in alignment with said fifth pulley, said second cable passing through said front seat opening and having an operating handle fastened to the terminal portion thereof.

WILLIAM NORMAN ANDREWS.